(12) United States Patent
Marinov et al.

(10) Patent No.: US 8,793,778 B2
(45) Date of Patent: Jul. 29, 2014

(54) SYSTEM FOR PROVIDING TRUSTED USER ACCESS OF COMPUTER SYSTEMS

(75) Inventors: Stefan Marinov, San Diego, CA (US); Kieran Miller, San Diego, CA (US)

(73) Assignee: Spamcaptcher Inc., San Diego, CA (US)

( * ) Notice: Subject to any disclaimer, the term of this patent is extended or adjusted under 35 U.S.C. 154(b) by 0 days.

(21) Appl. No.: 13/602,046

(22) Filed: Aug. 31, 2012

(65) Prior Publication Data

US 2014/0068735 A1 Mar. 6, 2014

(51) Int. Cl.
G06F 21/00 (2013.01)
H04L 29/06 (2006.01)
G06Q 30/00 (2012.01)
G10L 21/00 (2013.01)
G06F 7/04 (2006.01)
G06F 15/16 (2006.01)
H04W 12/06 (2009.01)

(52) U.S. Cl.
USPC .......... 726/7; 726/3; 726/21; 726/22; 726/23; 705/14.66; 382/296

(58) Field of Classification Search
USPC ............. 726/7, 3, 21, 23, 22; 382/296; 705/14.66
See application file for complete search history.

(56) References Cited

U.S. PATENT DOCUMENTS 7,891,005 B1 * 2/2011 Baluja et al. ............. 726/26
8,090,219 B2 1/2012 Gossweiler, III et al.
8,196,198 B1 6/2012 Eger
2009/0328150 A1 12/2009 Gross
2011/0231913 A1 * 9/2011 Feng et al. ............. 726/7
2012/0090028 A1 * 4/2012 Lapsley et al. ............. 726/22
2012/0246008 A1 * 9/2012 Hamilton et al. ............. 705/14.66

FOREIGN PATENT DOCUMENTS

EP 1594282 A1 * 11/2005

OTHER PUBLICATIONS

Karthick Jayaraman, Paul G. Talaga, Grzegorz Lewandowski, Steve J. Chapin, Munawar Hafiz; "Modeling user interactions for (fun and) profit: preventing request forgery attacks on web applications"; Aug. 2009; PLoP '09: Proceedings of the 16th Conference on Pattern Languages of Programs; Publisher: ACM; pp. 1-9.*

* cited by examiner

*Primary Examiner* — Andrew Nalven
*Assistant Examiner* — Courtney Fields
(74) *Attorney, Agent, or Firm* — ARC IP Law, PC; Joseph J. Mayo

(57) ABSTRACT

Enables trusted user access of computer systems for example that verifies trusted users and may allow trusted users to bypass challenge-response tests, while limiting access by automated processes and unwanted human challenge-response test solvers. Embodiments may implement an account that may be utilized across websites to enable a valid or trusted user to bypass challenge-response tests. Embodiments of the invention cost time, or cost a nominal fee, or require use of something that may be validated as owned by a user such as a physical address or cell phone, or trusted referral or social graph or any combination thereof, but cost large amounts time or money for spammers using cheap third world labor, thus making it expensive to invoke attacks on sites protected by embodiments of the invention.

16 Claims, 15 Drawing Sheets

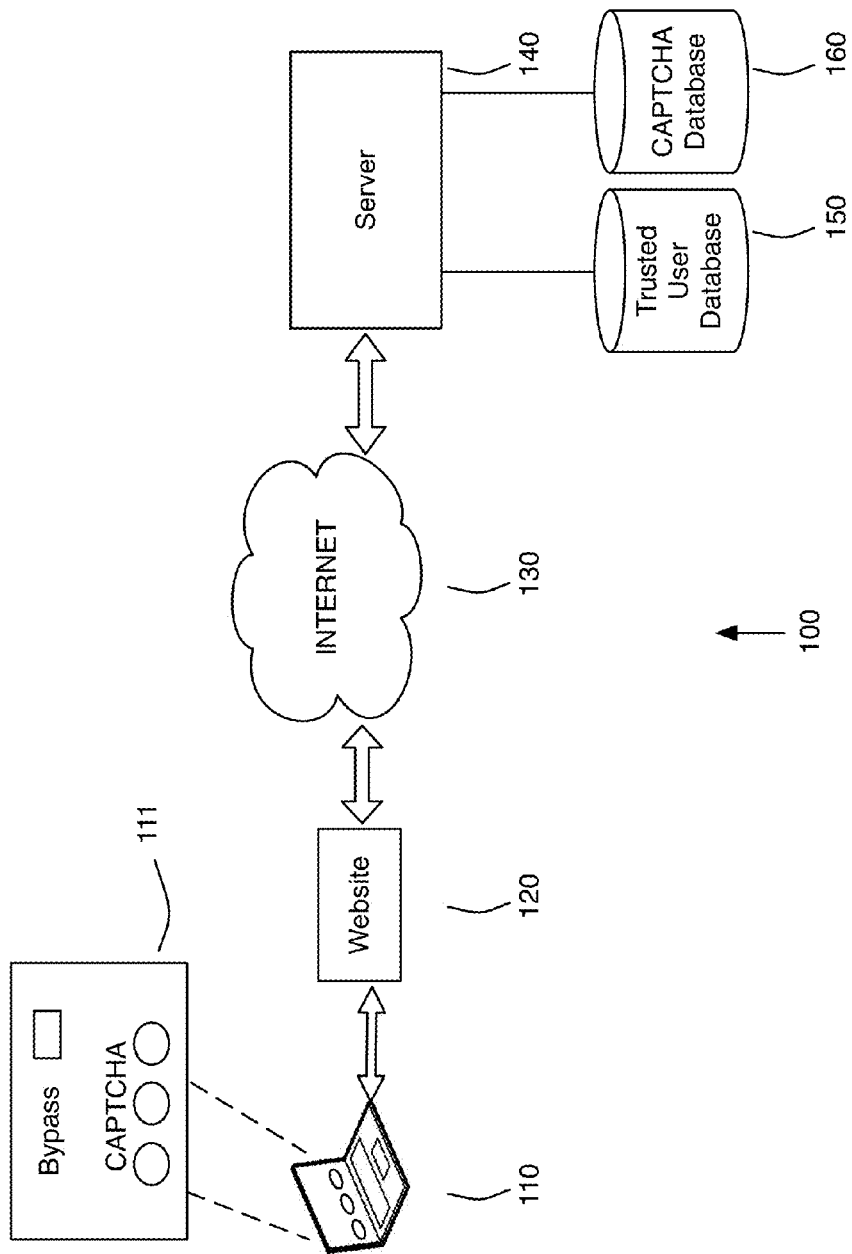

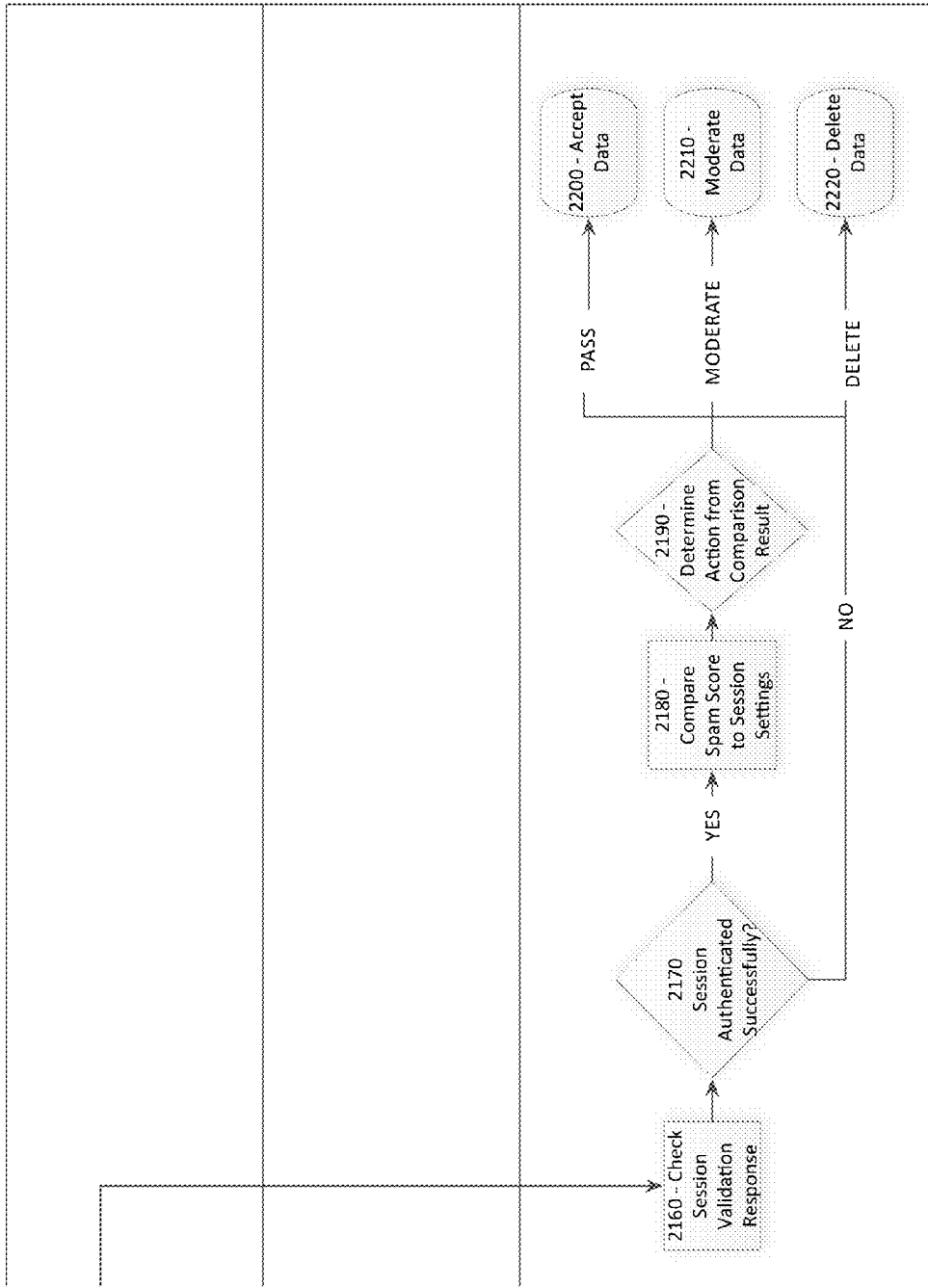

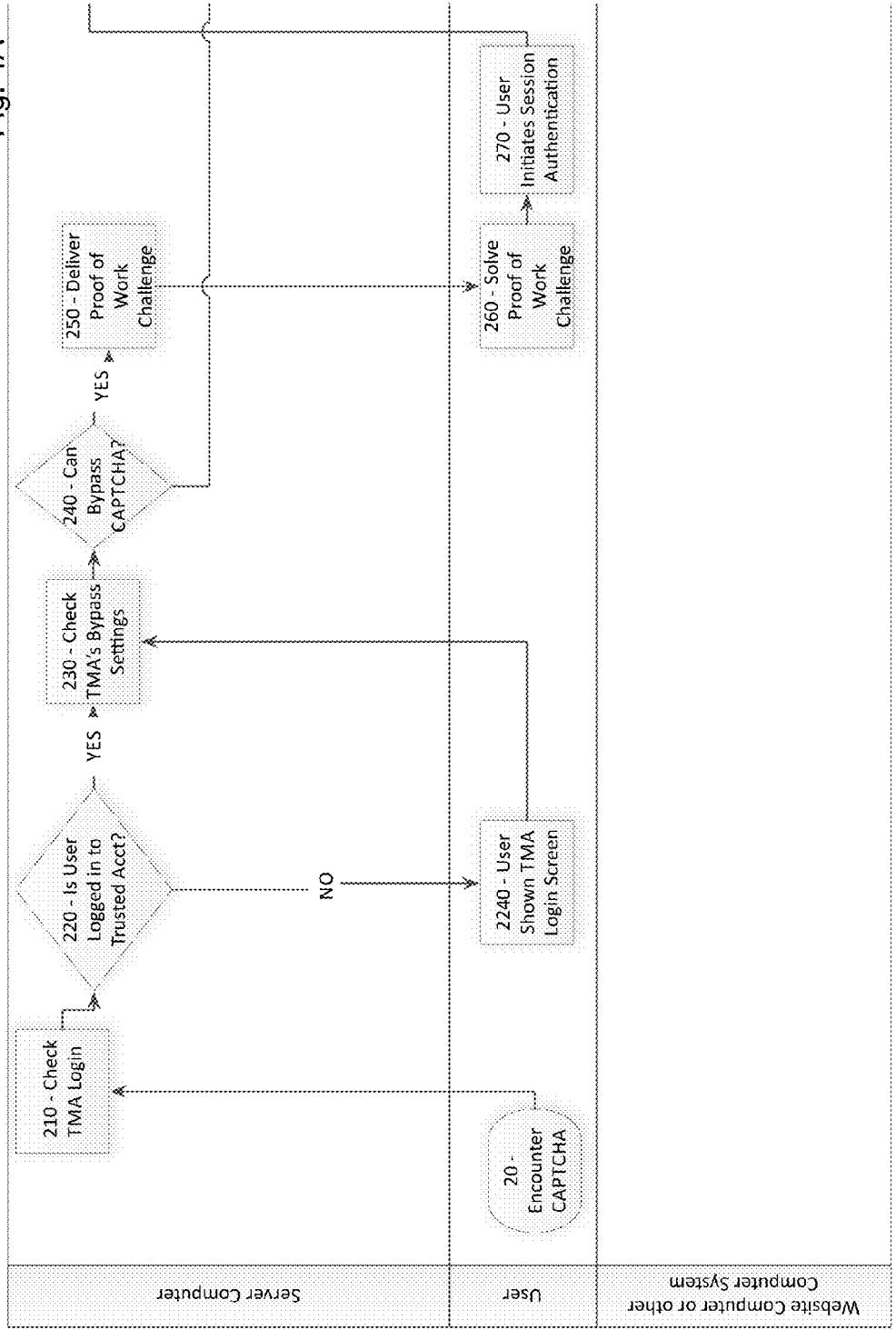

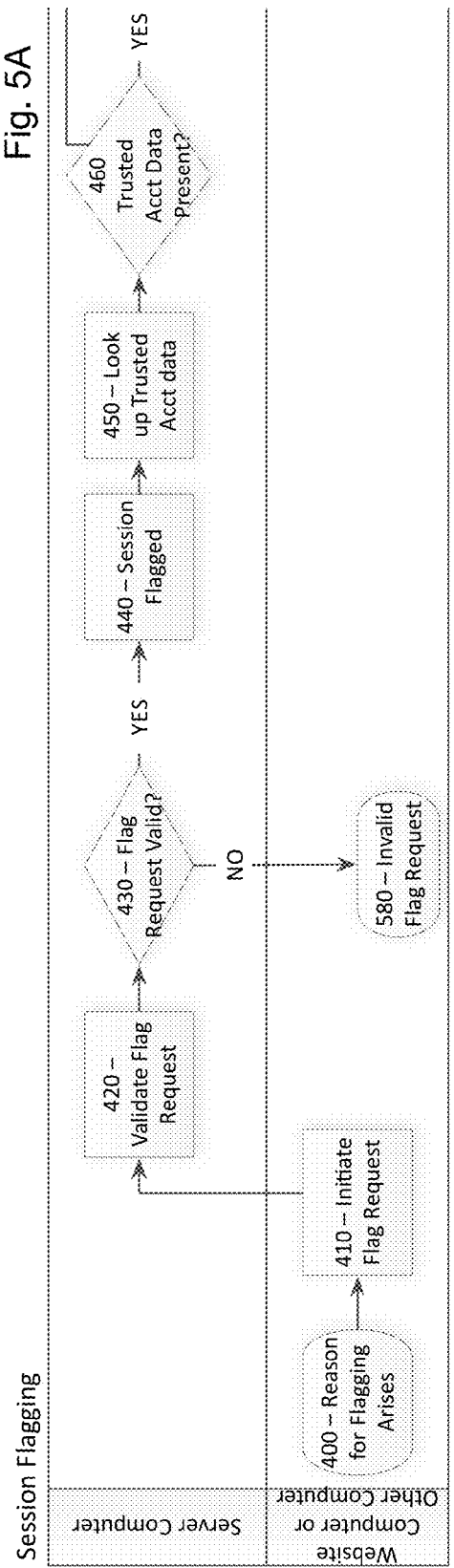

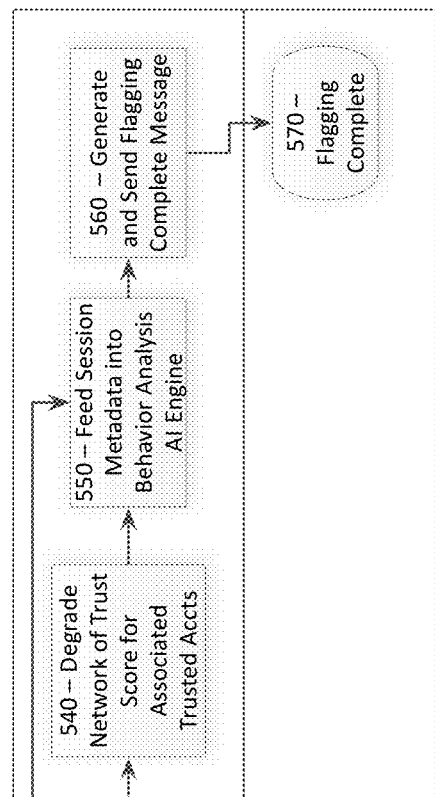

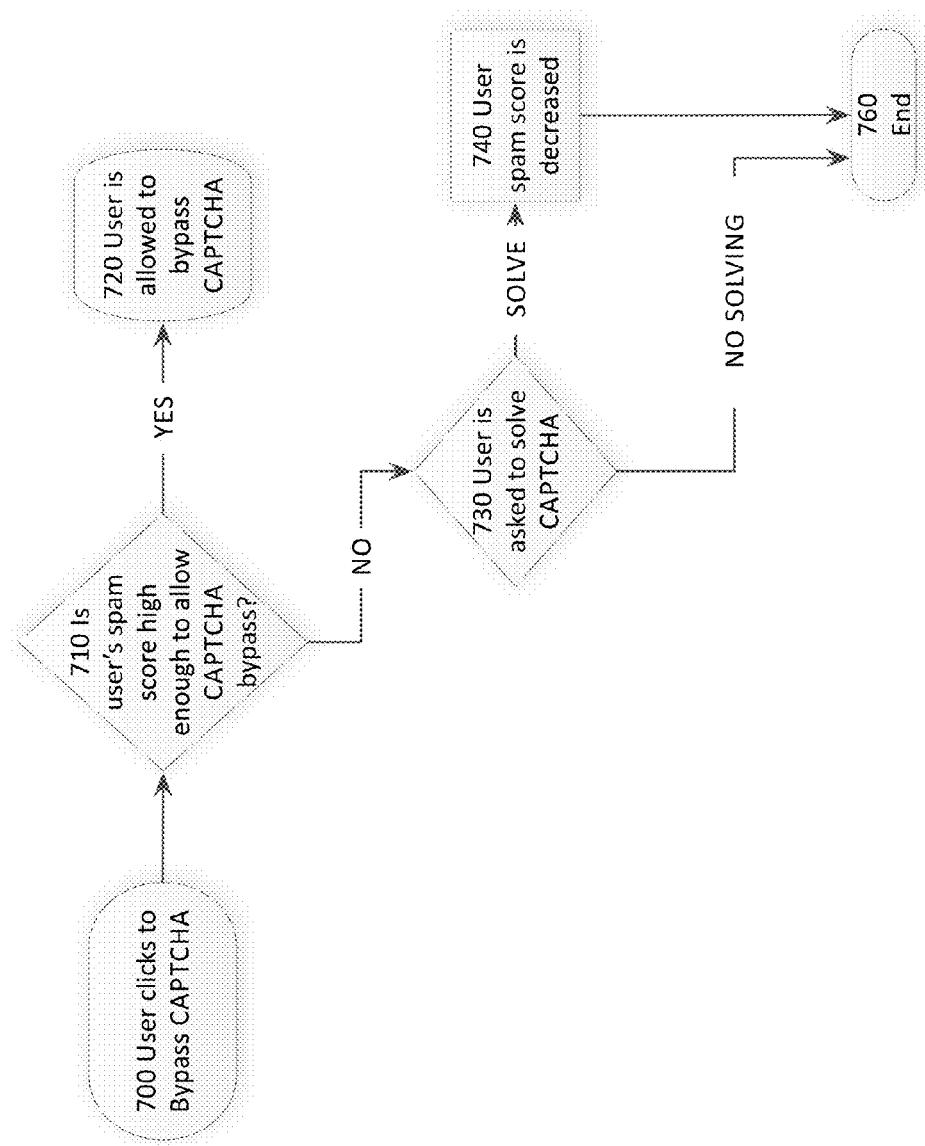

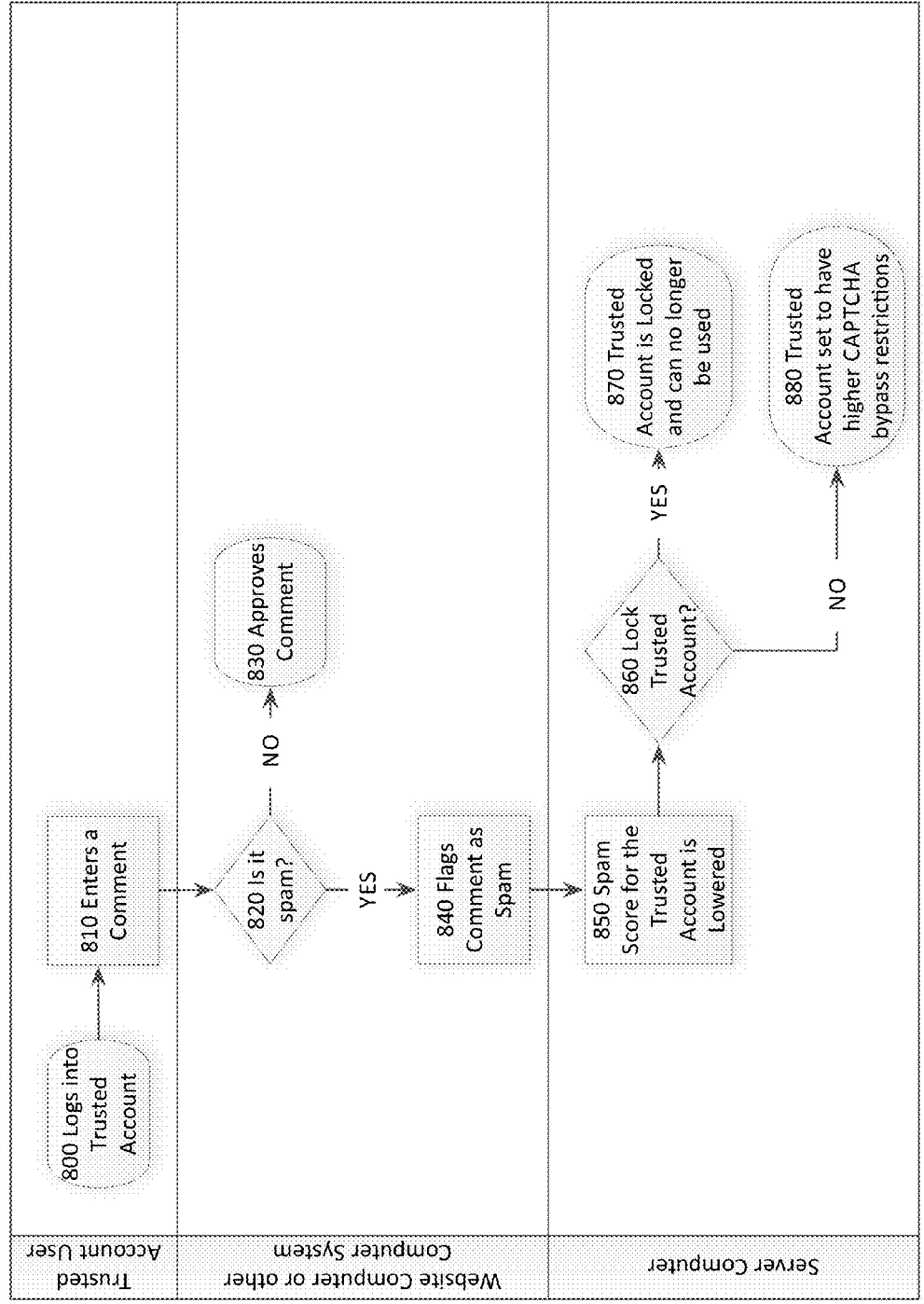

SYSTEM FOR PROVIDING TRUSTED USER ACCESS OF COMPUTER SYSTEMS

BACKGROUND OF THE INVENTION

1. Field of the Invention

One or more embodiments of the invention are related to the field of computer systems and security. More particularly, but not by way of limitation, one or more embodiments of the invention enable a system for providing trusted user access of computer systems for example that verifies trusted users and may allow trusted users to bypass challenge-response tests, while limiting access by automated processes and unwanted human challenge-response test solvers.

2. Description of the Related Art

Challenge-response tests are typically used to distinguish humans from computers to help combat automated access of computer systems. For example, current challenge-response tests are utilized to prevent spam by limiting automated access to online webmail accounts, as well as limiting automated postings to blogs, and other malicious automated online activities.

One type of challenge-response test is known as a CAPTCHA. The term CAPTCHA is an acronym that stands for "Completely Automated Public Turing test to tell Computers and Humans Apart". Common forms of CAPTCHAs include images having distorted letters and numbers and require users to visually discern and enter the letters and numbers into a computer to gain access.

Spammers currently utilize computer systems with sophisticated algorithms in an attempt to defeat these types of CAPTCHAs. For example spammers have been known to utilize advanced optical character recognition (OCR) technology, specifically with respect to the "segmentation" of images into areas having one character and subsequent identification of each character.

More distortion has been used in the images to make it more difficult to OCR the images. The resulting images are unfortunately harder to read by humans.

In response, spammers and other malicious entities have been known to hire human challenge-response solvers, for example human CAPTCHA solvers for low wages in third world countries to solve the CAPTCHAs. Human based attacks are more costly than a fully automated attack. A hybrid attack is also used by spammers and other malicious entities that combines human CAPTCHA solvers and an automated attack. A hybrid attack is more costly than a fully automated attack, but less costly than a human based attack.

In an attempt to combat these human CAPTCHA solvers it has been attempted to require users to register for an account before using a particular computer service. Then, when accounts perform activity deemed malicious or otherwise undesired the account is temporarily or permanently locked. The problem with this solution is that creating subsequent accounts only requires the malicious user to solve a CAPTCHA and/or have a valid email address (which typically also only requires solving a CAPTCHA). So, the cost to the user to create subsequent accounts is the same as it was to create the initial account. As a result, if it were cost effective to create the initial account and perform the malicious activity then it will be cost effective to continue the process of creating subsequent accounts and performing the malicious activity. As such, the solution does not stop the malicious activity There are no known solutions for bypassing challenge-response tests for trusted users that are cost effective and easy to create once, but costly and difficult to create multiple times. For at least the limitations described above there is a need for a system for providing trusted user access of computer systems that is cost effective and easy to create once, but costly and difficult to create multiple times and for example that verifies trusted users and may allow trusted users to bypass challenge-response tests, while limiting access by automated processes and unwanted human challenge-response test solvers.

BRIEF SUMMARY OF THE INVENTION

One or more embodiments described in the specification are related to a system for providing trusted user access of computer systems. Embodiments of the invention may provide or otherwise interface with a challenge-response test and may implement an account that may be utilized across websites or non-web based systems to enable a valid or trusted user to bypass challenge-response tests.

For example, one or more embodiments provide a CAPTCHA session and form that is forwarded to a server that determines whether to pass, moderate or delete the session. The value returned by the server may be implemented as a score that indicates how likely the user is to be malicious or a spammer or other non-valid user. The system enables trusted users to bypass the CAPTCHA entry by logging in or remaining logged in to the system. Website owners may flag data or users as spam related and flag an account, which in one or more embodiments locks the account, which requires an additional cost to create another account. Embodiments of the invention may charge users a nominal fee, and/or require a minimum predefined verifiable amount of time to be spent, and/or utilize any verifiable object that the user has in their possession that the user has a finite number of and that requires a non-trivial amount of time and/or money to acquire to register an account for. In the case where the user uses one or more items in their possession to register for an account, the one or more items may be associated with the account and only utilized a predefined number of times and/or the system may enforce a time gap between uses of the one or more items to register.

One or more embodiments of the invention enable a system configured to provide trusted user access of computer systems that includes a challenge-response database, a trusted user database and a server computer coupled therewith. The server computer is generally configured to accept an IP address of a computer associated with a user, and optionally for website embodiments, an http referrer value that represents the website being visited, optionally along with an account identifier for the website. The server is further configured to generate a session identifier and provide the session identifier to the computer associated with the user, check if the user is logged in based on the trusted user database and bypass a challenge-response test if the user is logged in and a number of bypassed challenge-response tests is less than a predefined number of bypasses allowed for the user, or provide a challenge from the challenge-response database to the user and accept a response from the user. In one or more embodiments, the system may validate a session with the user, generate a session validation response and send the session validation response to a website computer or web server that executes on the website computer for example wherein the session validation response includes a validity score.

In one or more embodiments, the predefined number of bypasses is a number of bypasses per time period, for example per day. Any other time period or characteristics associated with the number of bypasses may be utilized, such as metadata associated with the user or additional fees for example.

In one or more embodiments, the server computer is further configured to ensure that the user has logged in before the bypass of the challenge-response or before the server provides the challenge. In this secure mode, the user account may be adjusted or in any other manner limited based on the timing of the input, for example how many input attempts in a given time period, or type of input or any other quantity to enable determination of spamming or other potential problems or to avoid the potential of undesirable data entry by the user.

In one or more embodiments, the system allows the user to bypass the challenge-response test if a last session authentication has occurred within a session authentication timeout period. Any other type of authentication requirement such as every third bypass, etc., is in keeping with the spirit of the invention.

Embodiments of the server may also be configured to deliver a proof of work challenge to the computer associated with the user, validate the proof of work challenge and provide the challenge if the proof of work challenge does not validate. A proof of work challenge is an economic measure to deter denial of service attacks and other service abuses such as spam on a network by requiring some work from the service requester, usually meaning processing time by a computer. A key feature of these schemes is their asymmetry: the work should be moderately hard but feasible on the requester side and easy to check for the service provider. This algorithm is also known as Client Puzzle Protocol (CPP). This algorithm is distinct from a CAPTCHA, which is intended for a human to solve quickly, rather than a computer. One or more embodiments of the invention may provide a proof of work challenge that is a computational problem configured to solve a math, science, medical or other computational problem for a third party. This enables useful work to be performed by a distributed network as users are attempting to bypass challenge-response tests for example, which is unknown in the art.

Embodiments of the invention provide session authentication if the user initiates a session authentication, or wherein the computer associated with the user automatically initiates a session authentication for the server computer to validate. Any other method of session authentication is in keeping with the spirit of the invention.

Embodiments of the server computer may be further configured to accept a validation request from the website computer wherein the validation request includes the IP address of the computer associated with the user and configuration settings associated with the session, and any other values as described previously. Any other data may be utilized alternatively or in combination, as one skilled in the art will recognize.

Embodiments of the invention also enable the website computer to compare the validity score to thresholds or ranges. For example, in one or more embodiments, the validity score is compared against a first threshold that determines whether data provided by the user should be deleted or ignored by the website computer. One or more embodiments enable the validity score to be compared against a second threshold that determines whether data provided by the user should be accepted by the website computer. Alternatively or in combination, embodiments of the system enable the validity score to be compared against a range of values including the first threshold and the second threshold that determines whether data provided by the user should be moderated by someone associated with the website and/or the website computer, or other computer system to be protected as one or more embodiments may be utilized without a website for example wherein the website is exemplary of another computer system.

In one or more embodiments the challenge may be implemented with a CAPTCHA. Any other type of challenge-response technique, method or system may be utilized with embodiments of the system alternatively or in combination with CAPTCHAs for example.

In one or more embodiments, the server computer is further configured to charge a fee for the user to create an account in the trusted user database or ensure that the user requires a predefined amount of time to create an account in the trusted user database. Accounts may be generated via social network and/or via invites for example through email or text message, etc. Any other type of methodology including use of a known email address, home address or cell phone number or any other identifying information, for example that is verifiable may be utilized with embodiments of the invention alone or in combination with either fees or time or both.

Embodiments of the server computer may also be configured to accept a request from the website computer, or other computer system to be protected for example that indicates that the session is associated with undesirable data and decrease bypasses or lock an account associated with the user. For example, embodiments of the server computer may be configured to decrease the predefined number of bypasses associated with the user, or lock the account in the trusted user database associated with the user if the validity score is above a score threshold, or both decrease the predefined number of bypasses and lock the account if the user has an account in the trusted user database. If the account is locked, then in one or more embodiments it may not be reused or may require a fee or time or both or any other quantity to unlock. In one or more embodiments, the account is locked forever and may not be reutilized.

BRIEF DESCRIPTION OF THE DRAWINGS

The above and other aspects, features and advantages of the invention will be more apparent from the following more particular description thereof, presented in conjunction with the following drawings wherein:

FIG. 1 illustrates an architectural view of one or more embodiments of the system for providing trusted user access of computer systems.

FIGS. 2A and 2B illustrate a flow chart of a first embodiment of the invention.

FIGS. 4A, 4B and 4C illustrate a flow chart of a third embodiment of the invention.

FIGS. 5A, 5B and 5C illustrate a flow chart of an embodiment of the flagging of an account.

FIG. 7 illustrates a flow chart that depicts bypassing a challenge-response test using a trusted user account.

FIG. 8 illustrates a flow chart that depicts checking and potentially flagging a trusted account after a user enters undesirable data.

DETAILED DESCRIPTION OF THE INVENTION

Figure 2A:
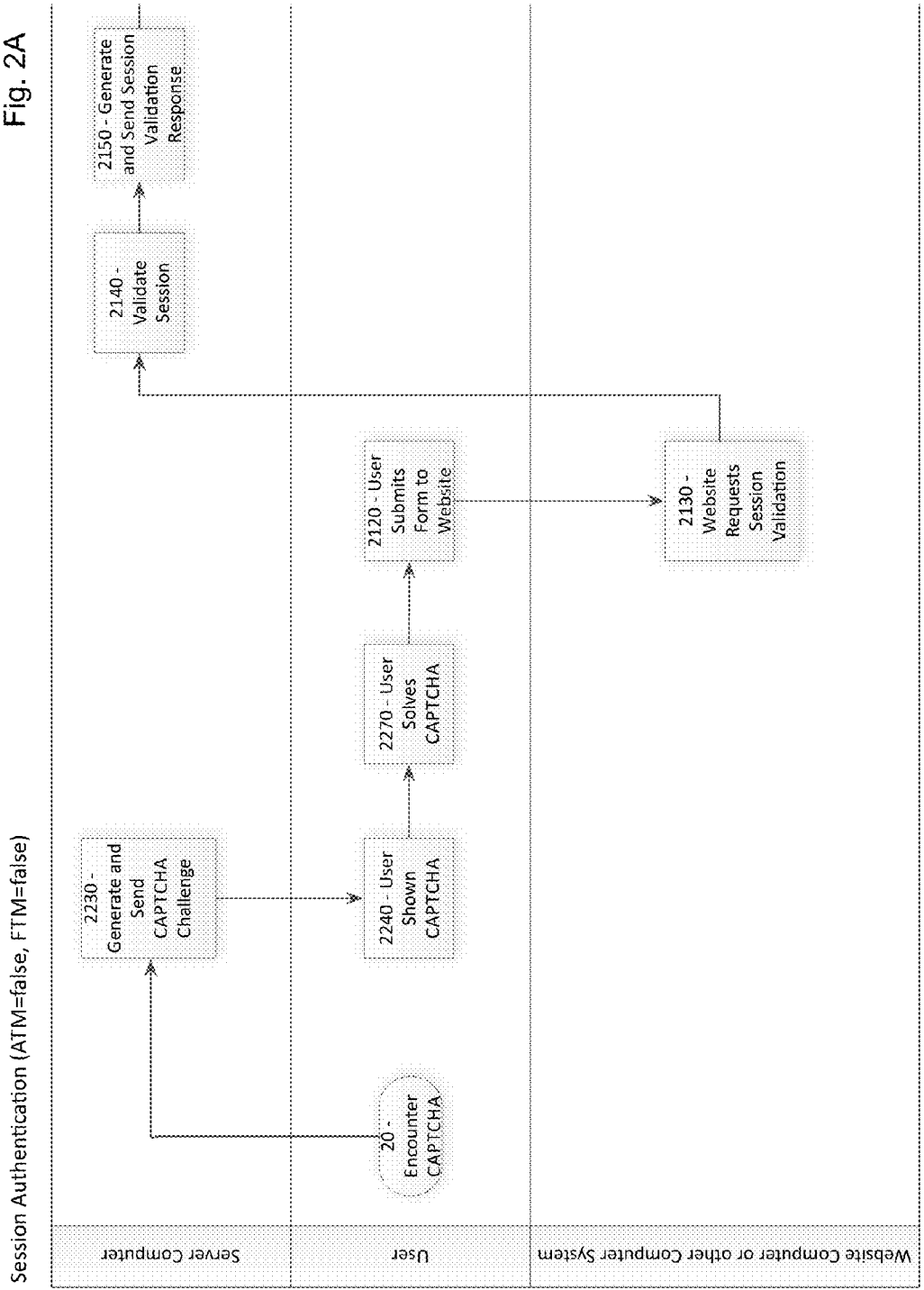

A system for providing trusted user access of computer systems will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 illustrates an architectural view of one or more embodiments of the system for providing trusted user access of computer systems. As shown, embodiments of the invention 100 may provide or otherwise interface with challenge-response test illustrated on the bottom portion of screen 111 of computer 110 associated with a user. Embodiments generally may be utilized with website computer 120 over Internet 130. One or more embodiments may employ server computer 140 and may implement an account in trusted user database 150 that may be utilized across websites such as website 120 to enable a valid or trusted user to bypass challenge-response tests that may be stored in challenge-response database 160, which may for example be implemented as a CAPTCHA database.

For example, one or more embodiments provide a CAPTCHA session and form illustrated on screen 111 that is forwarded via website computer 120 to server computer 140 for validation and back to website computer 120 that determines whether to pass, moderate or delete the session. Embodiments of the website computer may be any other computer system for example, and the website embodiment is used in exemplary form herein. The value returned by the server may be implemented as a score that indicates how likely the user is to be malicious or a spammer or other non-valid user. The system enables trusted users to bypass the CAPTCHA entry by logging in or remaining logged in to the system for example by clicking on the bypass button shown on the top of screen 111. Any other user gesture may be accepted by the system to indicate that the challenge-response test is to be bypassed. Website owners may flag data or users or sessions as spam related and flag an account for example held in trusted user database 150, which requires an additional cost to the account creator to create another account. Embodiments of the invention may utilize a social network for signup, or a cell phone for example or alternatively or in combination cost a nominal fee for users, but increased amounts of time or money for spammers using human labor including but not limited to cheap third world labor and also increased amounts of time or money for automated attacks or any combination thereof, thus making it expensive to invoke attacks on sites protected by embodiments of the invention. For example, embodiments of the invention may charge a nominal fee or time for users, or allow a user to utilize anything that they have or already own or have purchased that is verifiable, but charge increased amounts of time or money for spammers using human labor or for example cheap third world labor and automated attacks or partially automated attacks, thus making it expensive to invoke attacks on sites protected by embodiments of the invention. Whatever the user uses to register for the item may be tied to the account and utilized a predefined number of times or the system may enforce a time gap between uses of the item to register.

Embodiments of the system may utilize any component within the system to prevent or mitigate spam, prevent or mitigate distribution of viruses or undesirable data, prevent or mitigate ticket scalping, prevent or mitigate denial of service and distributed denial of service attacks, prevent or mitigate fraudulent voting, prevent or mitigate falsifying surveys, or provide a secure single sign-on or any combination thereof by for example locking an account or denying access to a computer system using a trusted user database having trusted accounts.

FIGS. 2A and 2B illustrate a flow chart of a first embodiment of the invention that does not allow use of a trusted account. The server computer is generally configured to accept an IP address of a computer associated with a user at 2230 after the website computer, for example that executes a website server software application such as APACHE™, displays a challenge-response at 20 via an embodiment of screen 111 as shown in FIG. 1. The server computer for example may accept a session identifier if one exists already and optionally for website embodiments, an http referrer value that represents the website being visited, optionally along with an account identifier for the website. If a session identifier does not already exist, the server computer generates the session identifier and provides the session identifier to the computer associated with the user. The challenge-response is shown at 2240 in the display and the user enters a response at 2270, for example in the display and submits a form at 2120 to the website computer for example. The website computer requests a session validation at 2130 wherein the server computer validates the session at 2140 and generates and sends a validation response at 2150 to the website computer. The website computer checks the validation response at 2160 and if the session has authenticated at 2170, then the validity score or spam score is compared to session settings at 2180 and an action is determined based on the result at 2190 wherein the action may be to accept data from the user at 2200 or moderate data at 2210 or delete or ignore data at 2220.

Figure 3A:
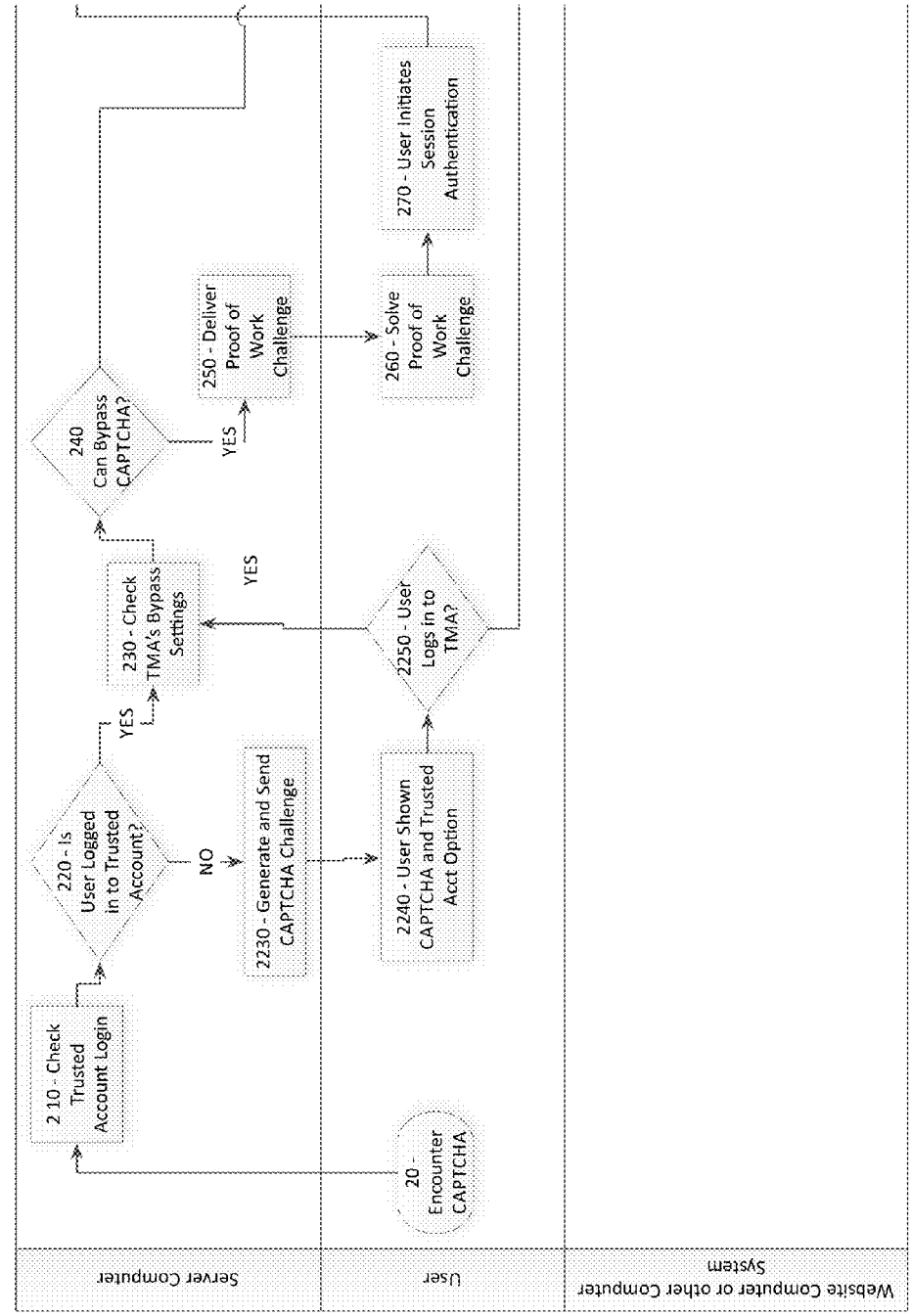
FIGS. 3A, 3B and 3C illustrate a flow chart of a second embodiment of the invention.
Figure 3B:
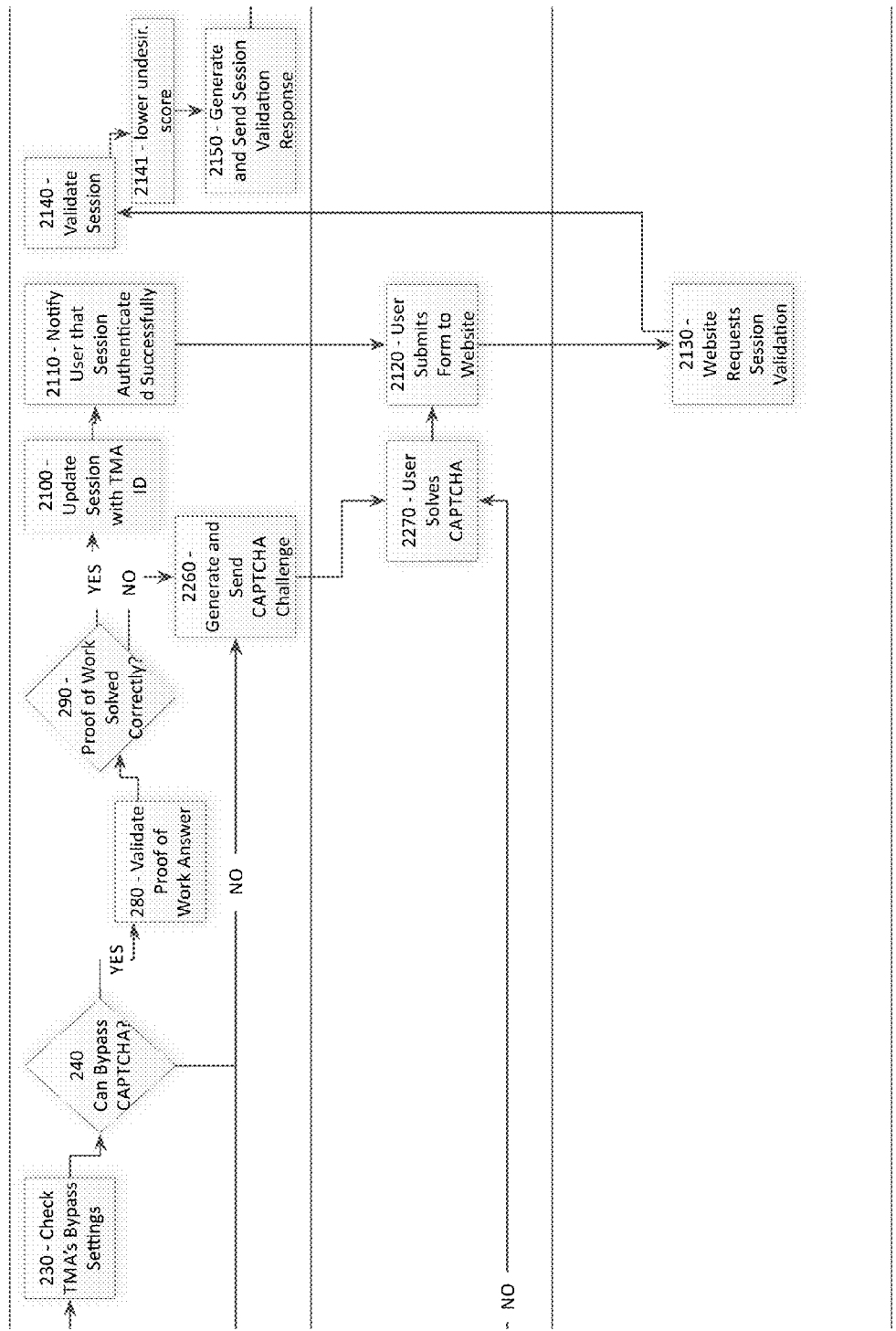
Figure 3C:
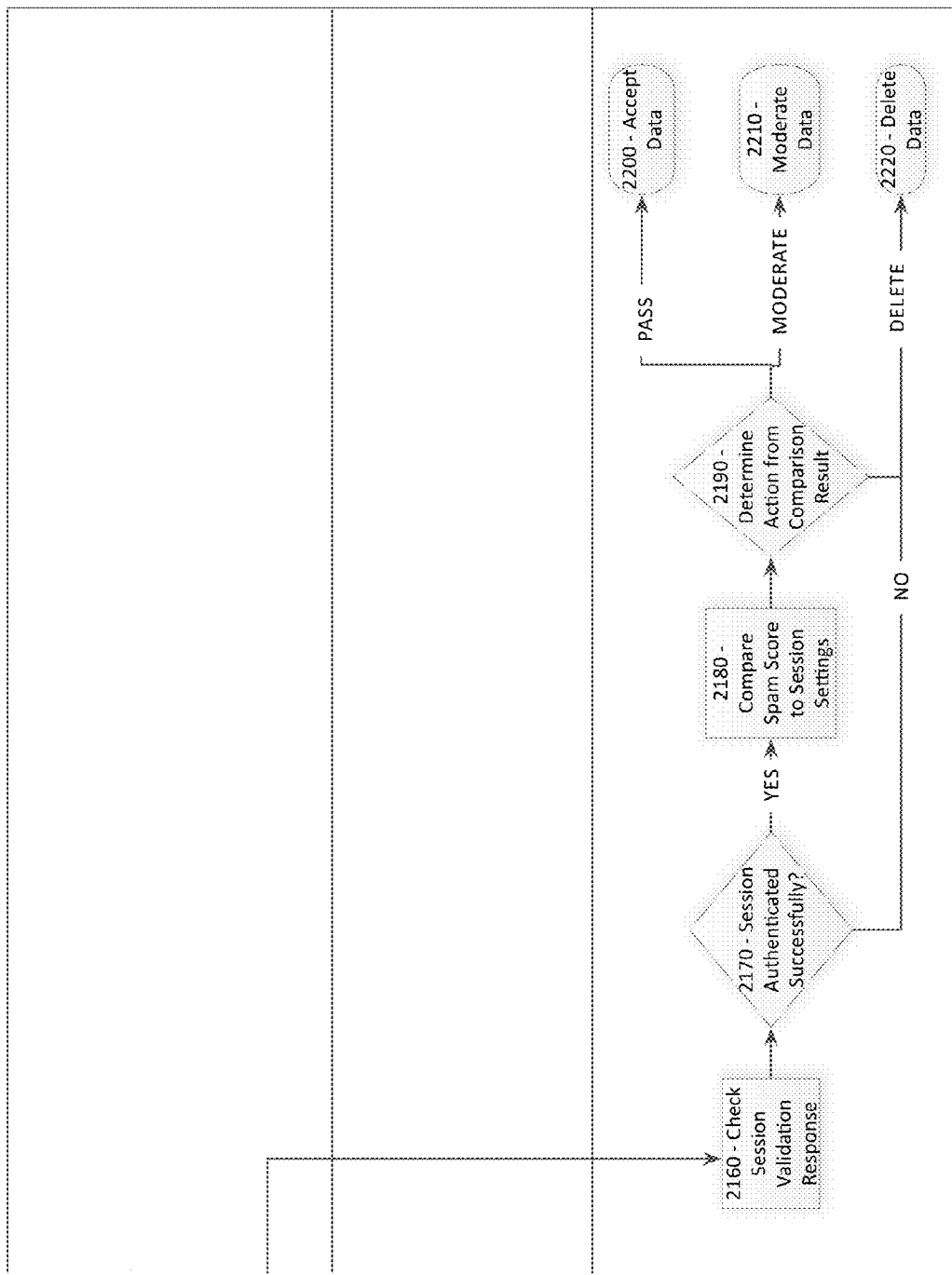

FIGS. 3A, 3B and 3C illustrate a flow chart of a second embodiment of the invention. In this embodiment, the server computer checks if the user is logged in at 210, for example based on trusted user database 150 and if so at 220 check the account bypass settings at 230 wherein if the user is allowed to bypass the challenge-response test at 240, the processing continues at 250 where the proof of work challenge is returned to the computer associated with the user. A proof of work challenge is an economic measure to deter denial of service attacks and other service abuses such as spam on a network by requiring some work from the service requester, usually meaning processing time by a computer. Any computing element in the system may initiate the authentication request on behalf of the user in keeping with the spirit of the invention. A key feature of these schemes is their asymmetry: the work should be moderately hard but feasible on the requester side and easy to check for the service provider. This algorithm is also known as Client Puzzle Protocol (CPP). This algorithm is distinct from a CAPTCHA, which is intended for a human to solve quickly, rather than a computer. One or more embodiments of the invention may provide a proof of work challenge that is a computational problem configured to solve a math, science, medical or other computational problem for a third party. For example, distributed problem solving may be utilized for large solutions to math problems such as encryption or genetic algorithms or other calculations that require large amounts of processing power such as fluid dynamics calculations or any other computational problem. This enables useful work to be performed by a distributed network as users are attempting to bypass challenge-response tests for example, which is unknown in the art. After the proof of work is solved by the computer associated with the user at 260, the user initiates a session authentication at 270 after which the bypass settings are checked at 230. A check for the ability to bypass is performed at 240. After the proof of work answer is validated at 280 and checked at 290 for a correct result, a challenge-response is sent at 2260 or the account identifier is utilized to update the session at 2100 if the proof of work is not solved correctly or is solved correctly respectively. After the session has been authenticated successfully and the user has been notified at 2110, then when the user submits the form to the website at 2120, the website requests session validation at 2130 and the server computer validates the session at 2140. In one or more embodiments, when the user commits a good transaction, i.e. solves a session with his/her trusted account, this adds good points to the user account and/or decreases the undesirable data score at 2141. As the undesirable score decreases and the user uses the account more the permissions on the account increase, for example the number of daily bypasses increases and the minimum time required between bypasses and transactions decreases. (This also applies to element 2140 and 2141 in FIG. 4B as well). Processing after the session is validated ensues as per FIG. 2B, also shown as FIG. 3C.

In one or more embodiments, if the user is logged in and a number of bypassed challenge-response tests is less than a predefined number of bypasses allowed for the user, for example during a given time period, then the challenge-response may be bypassed. If not, then the server computer provides a challenge for example from the challenge-response database to the user at 2230 and accepts a response from the user at 2240 or 2270 if the user logs in or does not log in respectively. After the user is shown the challenge-response and option to log in at 2240, the user may log in at 2250 or not.

In one or more embodiments, the system may validate a session with the user at 2140, generate a session validation response at 2150 and send the session validation response to a website computer wherein the session validation response includes a validity score that is checked for example at 2160.

In one or more embodiments, the predefined number of bypasses is a number of bypasses per time period, for example per day. Any other time period or characteristics associated with the number of bypasses may be utilized, such as metadata associated with the user or additional fees for example.

Figure 4B:
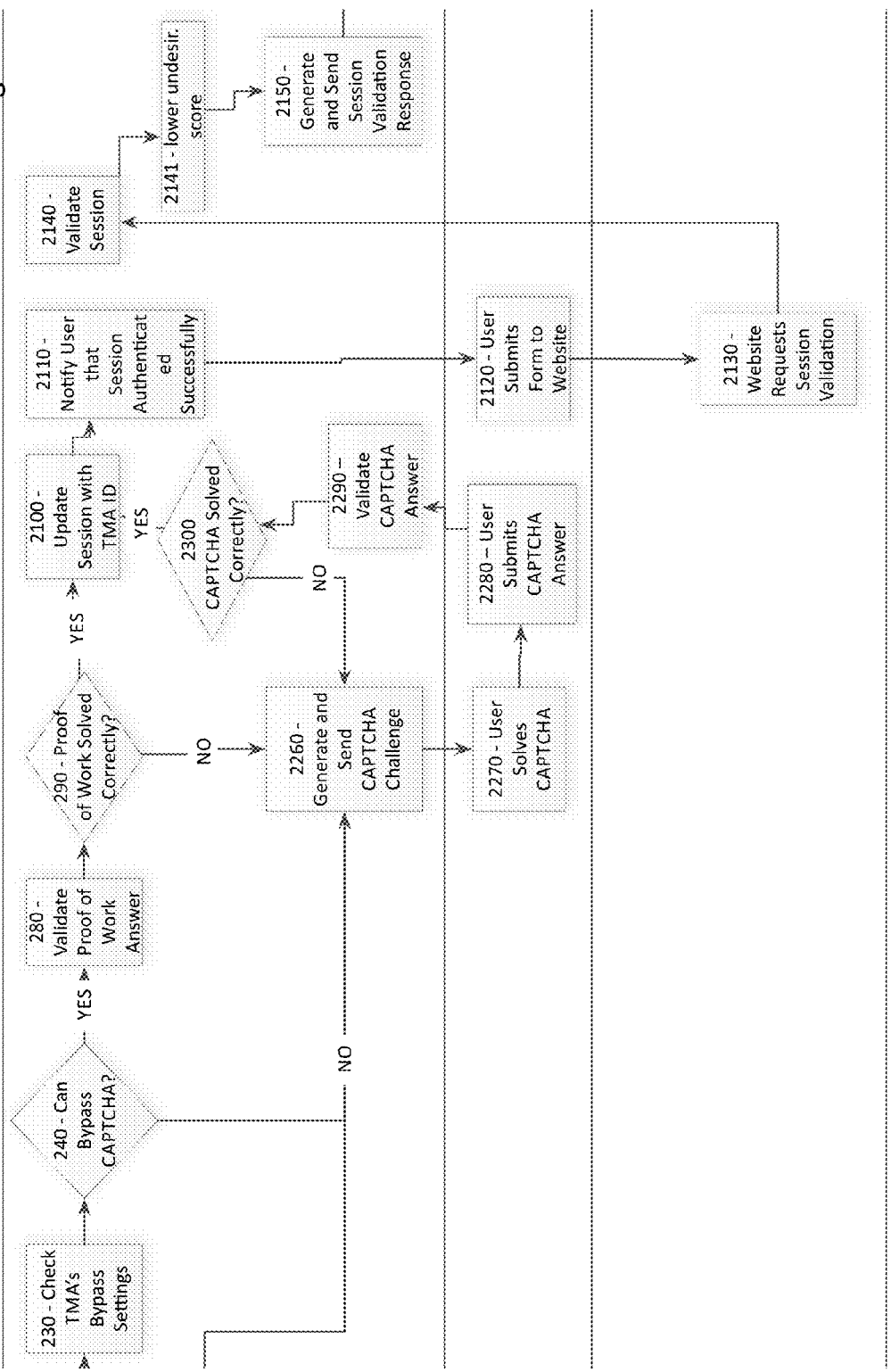
Figure 4C:
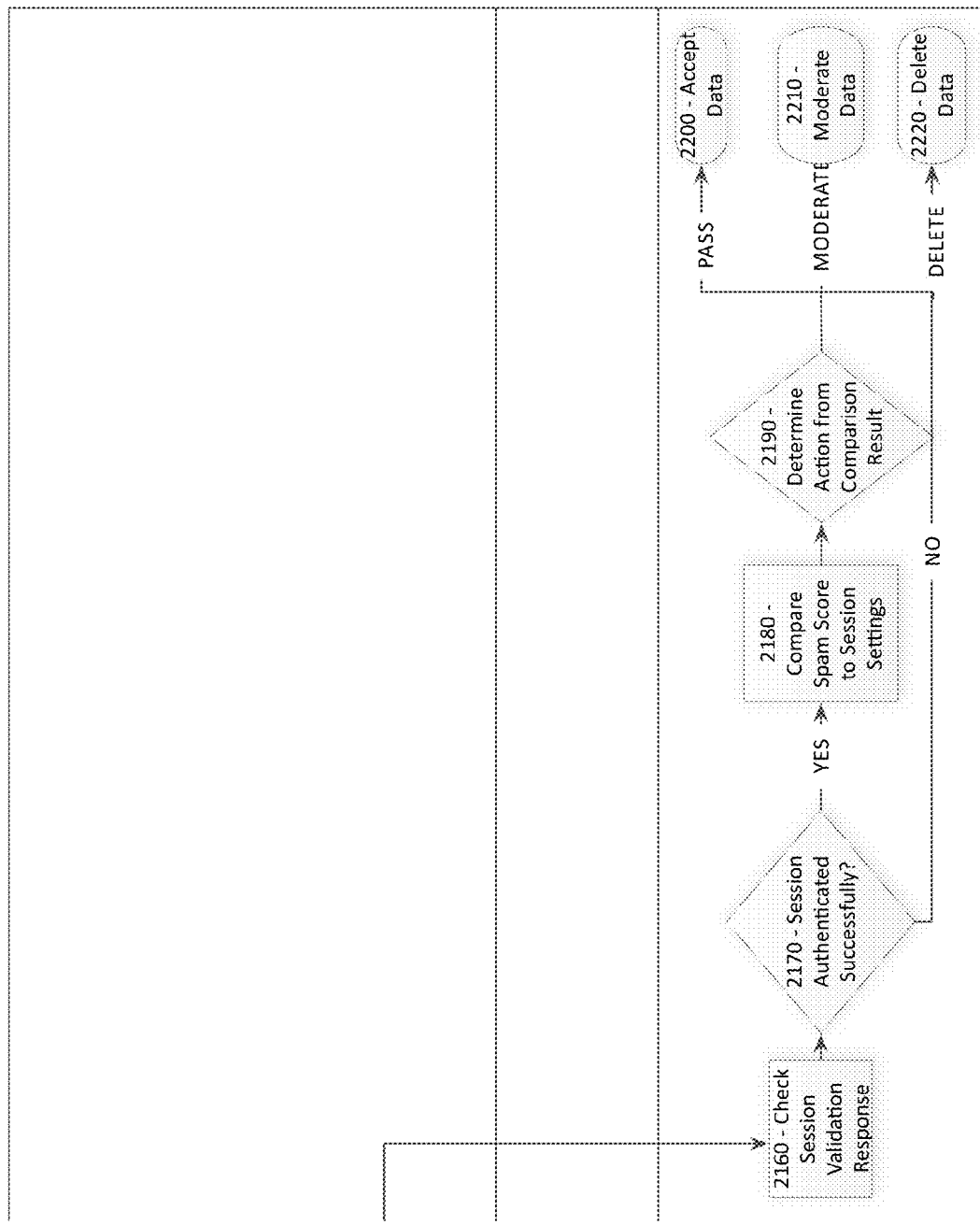

FIGS. 4A, 4B and 4C illustrate a flow chart of a third embodiment of the invention. This embodiment differs from FIG. 3 in that no challenge-response is initially sent at 2230 of FIG. 3, and the user is not shown a challenge-response at 2240 of FIG. 3 wherein the challenge response is performed at 2280, which is validated at 2290 and the challenge-response is checked at 2300.

In one or more embodiments, the server computer is further configured to ensure that the user has logged in before the bypass of the challenge-response or before the server provides the challenge. In this secure mode, the user account may be adjusted or in any other manner limited based on the timing of the input or type of input or any other quantity to enable determination of spamming or other potential problems or to avoid the potential of undesirable data entry by the user.

In one or more embodiments, the system allows the user to bypass the challenge-response test if a last session authentication has occurred within a session authentication timeout period, for example if the user last bypassed a session with a predefined amount of time. Any other type of authentication requirement such as every third bypass, etc., a predefined number of allowable bypasses, or any combination thereof is in keeping with the spirit of the invention.

Embodiments of the invention provide session authentication if the user initiates a session authentication, or wherein the computer associated with the user automatically initiates a session authentication for the server computer to validate. Any other method of session authentication is in keeping with the spirit of the invention.

Embodiments of the server computer may be further configured to accept a validation request from the website computer wherein the validation request includes the IP address of the computer associated with the user and configuration settings associated with the session. Any other data may be utilized alternatively or in combination, as one skilled in the art will recognize.

Embodiments of the invention also enable the website computer to compare the validity score to thresholds or ranges. For example, in one or more embodiments, the validity score is compared against a first threshold that determines whether data provided by the user should be deleted or ignored by the website computer. One or more embodiments enable the validity score to be compared against a second threshold that determines whether data provided by the user should be accepted by the website computer. Alternatively or in combination, embodiments of the system enable the validity score to be compared against a range of values including the first threshold and the second threshold that determines whether data provided by the user should be moderated by the website computer.

In one or more embodiments the challenge may be implemented with a CAPTCHA. Any other type of challenge-response technique, method or system may be utilized with embodiments of the system alternatively or in combination with CAPTCHAs for example.

In one or more embodiments, the server computer is further configured to charge a fee for the user to create an account in the trusted user database or ensure that the user requires a predefined amount of time to create an account in the trusted user database. Any other type of methodology including use of a known email address or cell phone number or any other identifying information, for example that is verifiable may be utilized with embodiments of the invention alone or in combination with either fees or time or both.

Figure 5B:
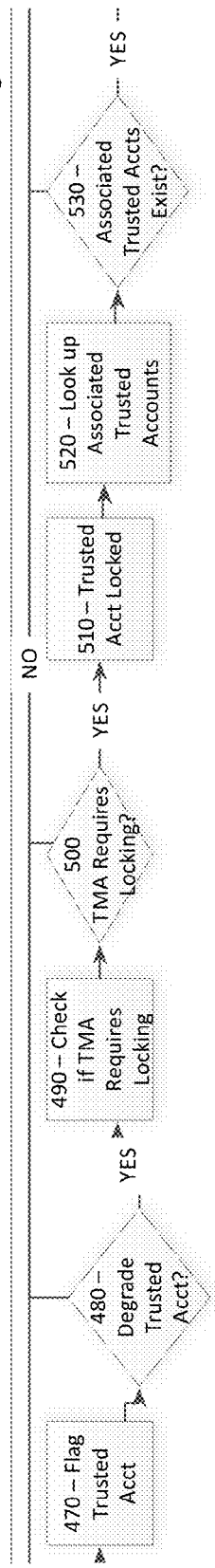

FIGS. 5A, 5B and 5C illustrate a flow chart of an embodiment of the flagging of an account, for example in the case of undesirable data that occurs at 400. For example, embodiments of the server computer may be configured to decrease the predefined number of bypasses associated with the user if the user has an account in the trusted user database, or lock the account in the trusted user database associated with the user if the validity score is above a score threshold, or both decrease the predefined number of bypasses and lock the account. If the account is locked, then in one or more embodiments it may not be reused or may require a fee or time or both or any other quantity to unlock. In one or more embodiments, the account is locked forever and may not be reutilized.

Specifically, embodiments of the server computer may also be configured to accept a request from the website computer at 410 that indicates that the session is associated with undesirable data and decrease bypasses or lock an account associated with the user. The server computer accepts the validate flag request at 420 and checks if the flag request is valid at 430. If the flag request is not valid, the server computer signifies that the request is invalid at 580, otherwise, the session is flagged at 440. The account data may be locked at 450 and if there is no account data present, for example in the trusted user database at 460 then session metadata may be utilized to analyze behavior at 550. If the account data does exist, then it is flagged at 470 and a decision is made whether to degrade the account at 480. A check is performed to determine if the account should be locked, for example if a threshold is crossed at 490. Based on the check, if the account requires locking at 500 then the account is locked at 510. Any associated accounts are looked up at 520 and if there are any associated accounts found at 530, then the network of associated accounts are degraded at 540, for example their trust score may be lowered. In one or more embodiments, then this may mean that the system will not trust associated accounts as much in the future when someone registers and has an association with the user. Associated accounts may be a group of accounts associated with the user or friends or associated with the user in any manner, for example as part of a domain, company or any other group of users. Processing continues at 550, wherein session metadata may be utilized to analyze behavior at 550. The server computer generates and sends flagging has completed message to the website computer at 560 and flagging finishes at 570.

Figure 6:
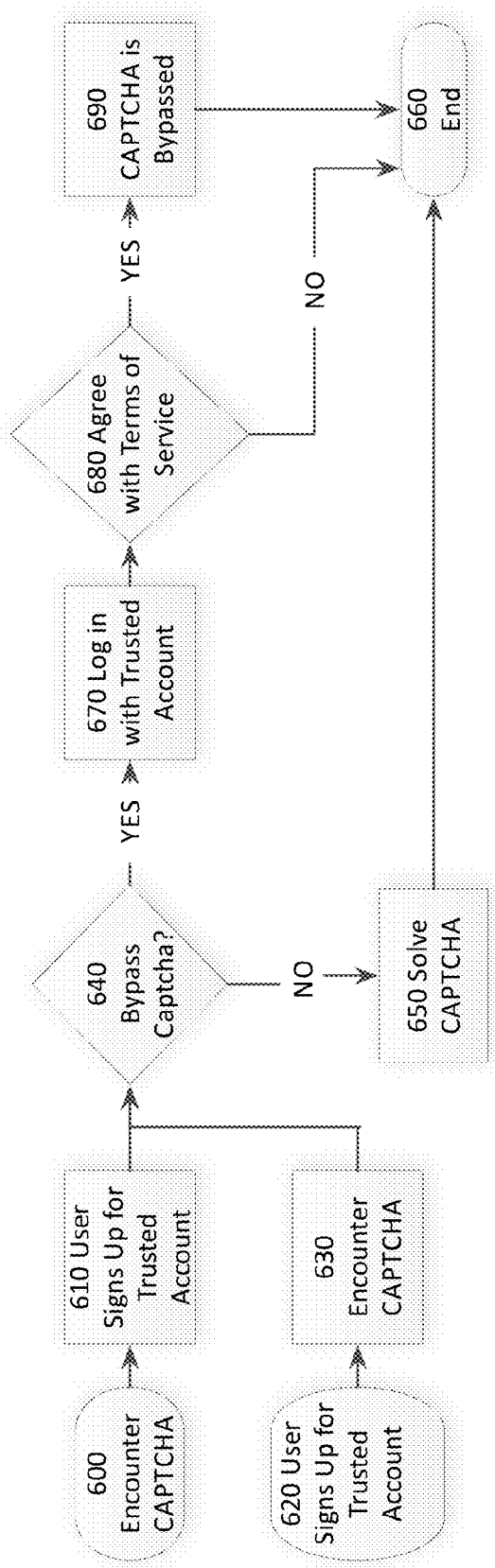
FIG. 6 illustrates a flow chart that depicts creating and using a trusted user account.

FIG. 6 illustrates a flow chart that depicts creating and using a trusted user account. A user encounters a challenge-response test at 600 and signs up for a trusted user account at 610. Alternatively, a user may sign up for a trusted user account at 620 before encountering a challenge-response test at 630. Embodiments of the invention enable creation of an online identity that is cheap and/or easy to create once but costly and/or difficult to create multiple times. Embodiments may utilize a nominal fee, cell phone, trusted referral, social graph, verified home address or any other item or items that cost money and/or time and/or that is verifiable and that the user has a finite number of is in keeping with the spirit of the invention.

For example, in one or more embodiments, the user pays a one time nominal fee to register the trusted account. If locked, for example through malicious activity that is detected by the system or anyone else using the system, then the user is required to register again and pay another fee. Embodiments strive to keep the expected value that the malicious user gets from an account prior to it being locked, to be less than the cost of creating the account and to also keep the cost of creating an account affordable to the majority of Internet users in the world.

Alternatively, or in combination, embodiments of the invention may utilize a cell phone for registration. This is a specific instance of using something that the user has a finite number of, that costs a nontrivial amount to acquire and is verifiable. User registers for an account using a cell phone number from a trusted cell phone provider and that number can never again be used to register for an account. Embodiments strive to keep the expected value that the malicious user gets from an account prior to it being locked to be less than the cost of registering for a new cell phone number with the trusted provider. This method is available to a majority of Internet users that already possess a cell phone number with one of the trusted providers.

Alternatively, or in combination, embodiments of the invention may utilize a trusted referral. For example, in one or more embodiments, users in the trusted database have two scores, one score that indicates how trusted a user is, i.e., a trust score, and another score that indicates how trusted the people they refer are, i.e., a network-of-trust score. When a user's trust score is high enough, the account has been around for long enough and the account has been used at least a minimum number of times, the account is eligible to invite a finite number of users to create accounts in a given period of time. If the users that the inviting account refers end up being trustworthy then the network-of-trust score of the inviting user's account is increased and that user can invite more users. On the other hand, if the users that the inviting account refers end up getting flagged and/or locked, then the network-of-trust score of the inviting user's account is lowered, but the trust score of the inviting user is not affected, and this decreases the likelihood that this account will be allowed to refer in more users.

Alternatively, or in combination, embodiments of the invention may utilize a social graph that in turn uses a trusted referral. For example, other system's account identifiers are associated with the various accounts in the trusted database. This allows the system to use social graphs from other systems, for example FACEBOOK® to associate accounts in the trusted database and potentially allow a new user to register with an account from another system. For example, in the case of FACEBOOK CONNECT®, if a user registers for an account in the trusted database using their FACEBOOK® account, then the system checks to ensure that the FACEBOOK® account in question has not been used to register a different trusted account in the system and then looks up the Facebook IDs of the friends of the user against all of the associated FACEBOOK® IDs in the trusted database and a total score is calculated based on the network-of-trust scores of the friends of the user. If the total score exceeds a predefined threshold then the user is granted an account. In one or more embodiments, the total score is normalized based on the number of friends or connections the registering user has to avoid bias for large social network graphs of some users.

Alternatively, or in combination, embodiments of the invention may utilize verified home address. This is another instance of using something that the user has a finite number of, that costs a non-trivial amount to acquire and is verifiable. The user gives their address and if it has not been used to register before as per a check of the trusted user database, then mail with a registration code is sent to that address. If the user retrieves the code and enters the code into the registration screen within a predefined amount of time, then the user is granted the account and that address cannot be used again to register, or the user must wait a certain amount of time to be able to register at that address again. Any other apparatus or method that costs time or money, that the user has a finite number of and/or is verifiable is in keeping with the spirit of the invention.

After the user signs up for an account and encounters a CAPTCHA, or visa versa as per 600, 610 or 620 and 630, a check is made to bypass the challenge-response test at 640. If not, the challenge-response is solved at 650 and processing ends at 660. If the user attempts to bypass the challenge-response test, then a login is presented at 670 and if the user agrees with the terms of service at 680, then the challenge-response test may be bypassed at 690, notwithstanding timeouts and other scores of behavior for example that may be implemented as desired.

FIG. 7 illustrates a flow chart that depicts bypassing a challenge-response test using a trusted user account. When a challenge-response test is presented with a bypass user interface element at 700 that the user asserts, the server computer checks to see if the user's undesirable data count or other validity score and any implemented predefined time windows are within timeout limits for example that enables the user to bypass the challenge-response test at 710. If so, the user is allowed to bypass the test at 720, if not, the user must solve the challenge-response test at 730. If the challenge-response test is solved at 730, then the undesirable data score or other validity score may be decreased at 740. Processing ends at 760.

FIG. 8 illustrates a flow chart that depicts checking and potentially flagging a trusted account after a user enters undesirable data. When the user logs into the trusted account at 800 and enters a comment at 810, the website computer is utilized to signify that the message is undesirable or not. For example, a person associated with the website may view the comment or other data from the user and check it for spam at 820 and if not approve the comment or data at 830. If the data is undesirable, then the session and/or data is flagged as undesirable at 840 and the server computer lowers the undesirable data score or other validity score of the trusted account at 850. If the value is low enough, then a check is performed to determine if the account should be locked at 860 and if so, the account is locked at 870. If not, the user and associated account may have higher challenge-response bypass restrictions set at 880.

While the invention herein disclosed has been described by means of specific embodiments and applications thereof, numerous modifications and variations could be made thereto by those skilled in the art without departing from the scope of the invention set forth in the claims.

What is claimed is:

1. A system configured to provide trusted user access of computer systems comprising:
   a challenge-response database;
   a trusted user database; and,
   a server computer configured to
   accept an IP address of a computer associated with a user or identification of said user;
   generate a session identifier and provide said session identifier to said computer associated with said user based on said IP address of said computer associated with said user or identification of said user;
   check if said user is logged in based on said trusted user database;
   bypass a challenge-response test if said user is logged in and if a number of bypassed challenge-response tests is less than a predefined number of bypasses allowed for said user and optionally if a number of current sessions is less than a predefined session number per time period, to enable said user to bypass said challenge-response test, and otherwise provide a challenge from said challenge-response database to said user and accept a response from said user;
   validate a session with said user;
   generate a session validation response; and,
   send said session validation response to a website computer or other computer system that said user is attempting to access, wherein said session validation response comprises a validity score and enable or disable access to said website computer or other computer based on said validity score;
   wherein said server computer is further configured to
   charge a fee for said user to create said account in said trusted user database or ensure that said user requires a predefined amount of time to create said account in said trusted user database or
   accept an input from an item that said user comprises a finite number of to create said account or wherein said item utilized to create an account costs over a predefined amount or wherein said item is verifiable to create said account or
   accept a cell phone number from said user to create said account in said trusted database
   or
   accept a code input from said user that was obtained from information sent to a physical address to create said account or
   allow an invited user referred from a trusted user to create said account if the trusted user has a network-of-trust score that is higher than a predefined value or
   allow a social network user from a social network site to create said account based on the friend identifiers of the social network user in the trusted database;
   wherein said server computer is further configured to
   accept a request from said website computer or said other computer system that said user is attempting to access that indicates that said session is associated with undesirable data; and,
   decrease said predefined number of bypasses associated with said user and optionally any associated accounts if said user has an account in said trusted user database;
   or
   lock an account in said trusted user database associated with said user if said validity score is above a score threshold
   or
   both decrease said predefined number of bypasses and lock said account.

2. The system configured to provide trusted user access of computer systems of claim 1 wherein said predefined number of bypasses is a number of bypasses per time period.

3. The system configured to provide trusted user access of computer systems of claim 1 wherein said server computer is further configured to ensure that said user has logged in before said bypass said challenge-response or said provide said challenge occurs.

4. The system configured to provide trusted user access of computer systems of claim 1 wherein said enable said user to bypass said challenge-response test occurs if a last session authentication has occurred within a session authentication timeout period.

5. The system configured to provide trusted user access of computer systems of claim 1 wherein said server computer is further configured to
   deliver a proof of work challenge to said computer associated with said user;
   validate said proof of work challenge; and,
   perform said provide said challenge if said proof of work challenge does not validate.

6. The system configured to provide trusted user access of computer systems of claim 5 wherein said proof of work challenge is a computational problem configured to solve a math, science, medical or other computational problem.

7. The system configured to provide trusted user access of computer systems of claim 1 wherein said user initiates a session authentication for said server computer to validate or wherein said computer associated with said user automatically initiates a session authentication for said server computer to validate.

8. The system configured to provide trusted user access of computer systems of claim 1 wherein said server computer is further configured to
   accept a validation request for said validate said session from said website computer wherein said validation request comprises
   identification of said user or
   said IP address of said computer associated with said user and optionally an http referrer value and an account identifier for a website after said user submits a form to said website; and,
   optionally configuration settings associated with said session.

9. The system configured to provide trusted user access of computer systems of claim 1
   wherein said validity score is compared against a first threshold that determines whether data provided by said user should be deleted or ignored by said website computer or said other computer system that said user is attempting to access;

wherein said validity score is compared against a second threshold that determines whether data provided by said user should be accepted by said website computer or said other computer system that said user is attempting to access;

wherein said validity score is compared against a range of values comprising a first threshold and a second threshold that determines whether data provided by said user should be moderated by said website computer or said other computer system that said user is attempting to access.

10. The system configured to provide trusted user access of computer systems of claim 1 wherein said challenge is a CAPTCHA.

11. The system configured to provide trusted user access of computer systems of claim 1 wherein said server computer is further configured to prevent or mitigate spam or prevent or mitigate distribution of viruses or undesirable data or prevent or mitigate ticket scalping or prevent or mitigate denial of service and distributed denial of service attacks or prevent or mitigate fraudulent voting or prevent or mitigate falsifying surveys or provide a secure single sign-on.

12. A system configured to provide trusted user access of computer systems comprising:

a challenge-response database; a trusted user database; a server computer configured to accept an IP address of a computer associated with a user or identification of said user;

generate a session identifier and provide said session identifier to said computer associated with said user based on said IP address of said computer associated with said user or identification of said user;

check if said user is logged in based on said trusted user database;

bypass a challenge-response test if said user is logged in and if a number of bypassed challenge-response tests is less than a predefined number of bypasses allowed for said user and if a last session authentication has occurred within a session authentication timeout period and optionally if a number of current sessions is less than a predefined session number per time period, to enable said user to bypass said challenge-response test, and otherwise provide a challenge from said challenge-response database to said user and accept a response from said user;

validate a session with said user;

generate a session validation response;

send said session validation response to a website computer or other computer system that said user is attempting to access, wherein said session validation response comprises a validity score and wherein said validity score is compared against a first threshold that determines whether data provided by said user should be deleted or ignored by said website computer or said other computer system that said user is attempting to access;

wherein said validity score is compared against a second threshold that determines whether data provided by said user should be accepted by said website computer or said other computer system that said user is attempting to access;

wherein said validity score is compared against a range of values comprising said first threshold and said second threshold that determines whether data provided by said user should be moderated by said website computer or said other computer system that said user is attempting to access;

wherein said server computer is further configured to charge a fee for said user to create said account in said trusted user database or ensure that said user requires a predefined amount of time to create said account in said trusted user database or accept an input from an item that said user comprises a finite number of to create said account or wherein said item utilized to create an account costs over a predefined amount or wherein said item is verifiable to create said account or accept a cell phone number from said user to create said account in said trusted database or accept a code input from said user that was obtained from information sent to a physical address to create said account or allow an invited user referred from a trusted user to create said account if the trusted user has a network-of-trust score that is higher than a predefined value or allow a social network user from a social network site to create said account based on the friend identifiers of the social network user in the trusted database;

wherein said server computer is further configured to accept a request from said website computer or said other computer system that said user is attempting to access that indicates that said session is associated with undesirable data; and, decrease said predefined number of bypasses associated with said user and optionally any associated accounts if said user has an account in said trusted user database;

or lock an account in said trusted user database associated with said user if said validity score is above a score threshold or both decrease said predefined number of bypasses and lock said account.

13. The system configured to provide trusted user access of computer systems of claim 12 wherein said server computer is further configured to ensure that said user has logged in before said bypass said challenge-response or said provide said challenge occurs.

14. The system configured to provide trusted user access of computer systems of claim 12 wherein said server computer is further configured to deliver a proof of work challenge to said computer associated with said user wherein said proof of work challenge is a computational problem configured to solve a math, science, medical or other computational problem;

validate said proof of work challenge; and, perform said provide said challenge if said proof of work challenge does not validate.

15. The system configured to provide trusted user access of computer systems of claim 12 wherein said challenge is a CAPTCHA.

16. A system configured to provide trusted user access of computer systems comprising:

a challenge-response database; a trusted user database; a server computer configured to accept an IP address of a computer associated with a user or identification of said user;

generate a session identifier and provide said session identifier to said computer associated with said user based on said IP address of said computer associated with said user or identification of said user; check if said user is logged in based on said trusted user database;

wherein said server computer is further configured to charge a fee for said user to create an account in said trusted user database or ensure that said user requires a predefined amount of time to create an account in said trusted user database or accept an input from an item that said user comprises a finite number of to create said account or wherein said item utilized to create an account costs over a predefined amount or wherein said item is verifiable to create said account or accept a cell phone number from said user to create said account in said trusted database or accept a code input from said user that was obtained from information sent to a physical address to create said account or allow an invited user referred from a trusted user to create said account if the trusted user has a network-of-trust score that is higher than a predefined value or allow a social network user from a social network site to create said account based on the friend identifiers of the social network user in the trusted database;

bypass a challenge-response test if said user is logged in and if a number of bypassed challenge-response tests is less than a predefined number of bypasses allowed for said user and wherein said predefined number of bypasses is a number of bypasses per time period and optionally if a number of current sessions is less than a predefined session number per time period, to enable said user to bypass said challenge-response test, and otherwise provide a challenge from said challenge-response database to said user and accept a response from said user;

wherein when said server computer bypasses said challenge-response test, said server computer is further configured to deliver a proof of work challenge to said computer associated with said user wherein said proof of work challenge is a computational problem configured to solve a math, science, medical or other computational problem;

validate said proof of work challenge;

provide a challenge from said challenge-response database to said user and accept a response from said user if said proof of work challenge does not validate;

or accept a validation request for said validate said session from said website computer, wherein said validation request comprises said IP address of said computer associated with said user; and, configuration settings associated with a session;

validate said session with said user;

generate a session validation response;

send said session validation response to a website computer or other computer system that said user is attempting to access, wherein said session validation response comprises a validity score and wherein said validity score is compared against a first threshold that determines whether data provided by said user should be deleted or ignored by said website computer or said other computer system that said user is attempting to access;

wherein said validity score is compared against a second threshold that determines whether data provided by said user should be accepted by said website computer or said other computer system that said user is attempting to access;

wherein said validity score is compared against a range of values comprising said first threshold and said second threshold that determines whether data provided by said user should be moderated by said website computer or said other computer system that said user is attempting to access;

accept a request from said website computer that indicates that said session is associated with undesirable data; and, decrease said predefined number of bypasses associated with said user if said user has an account in said trusted user database;

or lock an account in said trusted user database associated with said user if said validity score is above a score threshold or both decrease said predefined number of bypasses and lock said account; and, optionally ensure that said user has logged in before said bypass said challenge-response or said provide said challenge occurs.

* * * * *